United States Patent [19]

Thomas

[11] 4,211,651
[45] Jul. 8, 1980

[54] WATER RECLAMATION PROCESS

[76] Inventor: Robert C. Thomas, 3740 Campus Dr., Newport Beach, Calif. 92660

[21] Appl. No.: 935,882

[22] Filed: Aug. 23, 1978

Related U.S. Application Data

[63] Continuation of Ser. No. 724,568, Sep. 20, 1976, abandoned, which is a continuation of Ser. No. 585,455, Jun. 9, 1975, abandoned.

[51] Int. Cl.² ............................ C02B 1/20; C02C 5/02
[52] U.S. Cl. ........................................ 210/44; 210/50; 210/54; 210/64; 210/82
[58] Field of Search .................. 210/42 R, 44, 50-54, 210/62-64, 735, 80, 82, 221 P, 290, 97

[56] References Cited

U.S. PATENT DOCUMENTS

| | | | |
|---|---|---|---|
| 2,901,114 | 8/1959 | Smith et al. | 210/62 |
| 3,147,217 | 9/1964 | Halton | 210/44 |
| 3,192,155 | 6/1965 | Bready et al. | 210/44 |
| 3,321,649 | 5/1967 | De Benedictis et al. | 210/54 |
| 3,655,048 | 4/1972 | Pergola | 210/221 P |
| 3,673,065 | 6/1972 | Anderson | 210/44 |
| 3,764,013 | 10/1973 | Eisenmann | 210/44 |
| 3,876,546 | 4/1975 | Hsiung et al. | 210/290 |

OTHER PUBLICATIONS

Grieves et al., "Treating Laundry Wastes by Foam Separation", JWPCF, Mar. 1973, pp. 470-479.

Primary Examiner—Charles N. Hart
Assistant Examiner—Peter A. Hruskoci
Attorney, Agent, or Firm—Christie, Parker & Hale

[57] ABSTRACT

Dirty process water is collected from a process unit and introduced into a raw water holding tank. Water from the tank is passed at a uniform rate through a flotation cell where solids are frothed by flocculation and aeration and removed. The flocculating agent is a short chain cationic polymer. Water from the flotation cell is sterilized and then introduced into a treated water holding tank where it is withdrawn at a uniform rate and filtered to remove more solids. The filtered water is stored in a filtered water storage vessel for its use in the process facility. Heat exchange keeps the filtered water at required temperature. Water discharged from the system to a sanitary sewer may have various degrees of purity.

21 Claims, 4 Drawing Figures

WATER RECLAMATION PROCESS

This is a continuation of application Ser. No. 724,568 filed Sept. 9, 1976 abandoned; which is a continuation of Ser. No. 585,455, abandoned.

BACKGROUND OF THE INVENTION

The present invention relates to water treatment in general, and, in particular, to a reclamation process particularly for use in hospital and health care laundry facilities for the removal of solids from laundry wash water and the sterilization of the water.

In many areas of the country the cost of water and its availability make it necessary to conserve this resource as much as possible. In addition, sewage facilities are often overtaxed. Accordingly, it is becoming the practice to recycle or reclaim water for reuse.

Hospital and health care laundries use a considerable amount of water. This water becomes dirty because of soil, in solid form, from the wash. For water reclamation in such facilities, it is necessary to effectively and economically remove a significant amount of the solids from raw wash water. Sterilization of the recycled water is also necessary.

Solids can be removed from laundry water in flotation cells. In a cell solids agglomerate with a flocculating agent and the agglomerates attach to air bubbles. The agglomerates are removed, say, by skimming. Solids can also be removed in a filter which traps the solids and separates them from laundry water. One problem with these removal techniques is that each requires a uniform rate of dirty water input for optimum performance and the dirty water is not generated at the same rate or uniformity. Moreover, and compounding the problem, is the requirement that treated water be available for laundry usage. While the conservation of water is itself laudable, the purity of any water discharged to sewage can also be important.

Water sterilization by such agencies as chlorination, fluoridation, ultraviolet radiation or ozonization is necessary in hospital and health care facilities and is known as such. With chemical agents, time is required for adequate sterilization.

SUMMARY OF THE INVENTION

The present invention provides a water reclamation process for use in facilities requiring water sterilization, such as hospital and health care laundries, to take from dirty water suspended solids and to sterilize the water for reuse. The process does this in a balance system where a flotation cell and filter are fed water at uniform and optimized rates.

In general, the present invention contemplates taking raw, dirty water and accumulating it in a waste water holding vessel where it accumulates to supply a flotation cell at a constant rate. In the flotation cell flocculating agents and aeration remove suspended solids. Treated water from the cell is then subjected to a sterilization treatment and passed into a partially treated water storage vessel where it can accumulate and supply a filter at a uniform rate. The filter removes further solids. Means are provided to terminate and initiate flow from the vessels when there is insufficient water in them to supply their serviced units at a sufficient rate and quantity, and to initiate flow when adequate levels are reached. Preferably filtered water is stored in a vessel for use in the process facility, such as washers in a laundry. It is preferred that the stored water be maintained at a temperature suitable for the process of the facility so that when water is demanded it need not be heated first.

More in particular, waste water from a collection point is stored in the holding vessel and withdrawn from the vessel at a rate corresponding to the rate capacity of the flotation cell. Thus the holding vessel assures sufficient water input to the cell to satisfy its rate dictates. The flotation cell preferably is of the type from which dissolved air is released from solution and bubbles up through the cell. These bubbles collect agglomerated solids to form a froth which is then removed. Treated water from the flotation cell flows into the partially treated water storage vessel. When there is a predetermined amount of water in the storage vessel it is taken off for filtration and further purification from solids. After filtration, and as previously mentioned, the water is stored in a filtered water storage vessel.

Sterilization of the water is downstream of the flotation cell and preferably upstream from the partially treated water storage vessel. The vessel then provides time for chemical sterilization agents to sterilize the water. For thorough sterilization the vessel is baffled to force mixing and assure adequate residence of the water by avoiding channeling.

When the filter needs cleaning, a sensor may measure pressure drop across it which corresponds to a maximum amount of waste solids in the filter and initiate a backwashing operation to clean the filter. It is preferred that this backwash water be recycled through the flotation and filtration processes by being sent to the waste water holding vessel.

Water discharged from the system to a sanitary sewer may readily be treated to a desired degree of purity. When a degree of purity more than that obtainable by the flotation cell alone but less than that obtainable by both the cell and filter is required, it is preferred that discharge be taken downstream from both the flotation cell and filter. This enables uniform feed into the purification components without large components. To take off only after the filter, for example, would require larger components because the filter would have to have a bigger capacity.

In laundry applications it is preferred to maintain the pH of the water from about 6.5 to about 12. This pH, once attained, remains unchanged throughout the process. Again in the laundry applications it is desired to have an active alkalinity level, active in the sense that there are ingredients which effect cleansing action of the water. An active alkalinity level, however, often varies from essentially zero to 1500 parts per million. It is preferred to have a pH of about 10.5 and an active alkalinity of 250 ppm in the clean water.

If the waste suspended solids become too great, say about 3500 ppm, it becomes extremely difficult to treat the water by the process of the present invention. It is therefore preferred to combine waste streams in such a manner so as to produce a composite having about 500 ppm or less of suspended solids. Treated and filtered water has a purity of 20 ppm of suspended solids or less.

It has been found that a short chain cationic polymer is an ideal flocculating agent. An anionic polymer does not seem to work. It seems that an anionic short chain polymer does not disperse well and remains in globules.

Other flocculating agents such as members of the alum family could be used but these types of flocculating agents reduce water pH.

DESCRIPTION OF THE PREFERRED EMBODIMENT

Figure 1:
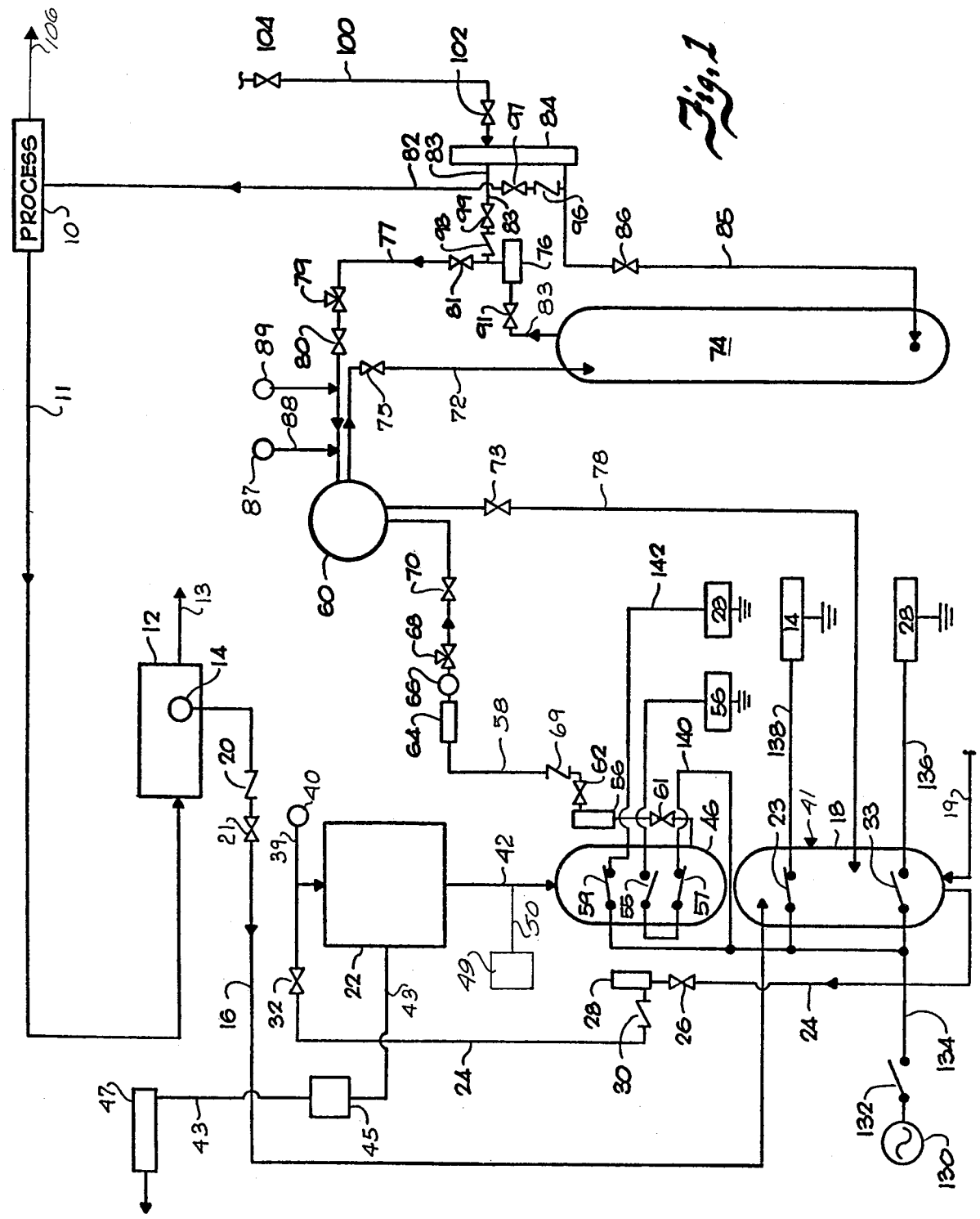
FIG. 1 is a flow schematic of one preferred process and system of the present invention.

With reference to the FIG. 1, a processing unit 10, say a series of washing units, generates raw, dirty water having a solid particle content which must be removed for water recycling. Solid removal to a level of about 20 ppm or lower is typically necessary. This raw, dirty water is collected from the process unit in a line 11 for delivery to a collection tank 12. A dump line 13 from tank 12 permits the discharge of some waste water directly into a sanitary sewer. A float control in this tank determines when water is pumped by a pump 14 through a line 16 into a raw waste water holding vessel or tank 18. A check valve 20 in the line permits flow of raw water only from the collection tank to the holding tank. A control valve 21 controls the flow of raw water through line 16 and is open during water treatment.

A normally closed float switch 23 in holding tank 18 terminates water flow from collection tank 12 to tank 18 when a predetermined amount of water is in the holding tank by opening and turning off pump 14.

A line 19 delivers and injects compressed air into raw water storage tank 18. The air mixes the water there. Air diffusion into the water in the tank may be by a perforated pipe. Some of the air dissolved in the water is released in a flotation cell 22 as bubbles to aid in the collection of waste solid agglomerates.

Flotation cell 22 provides a first stage of solid removal. This flotation cell is in series with holding tank 18 through a line 24. Line 24 has a control valve 26 upstream from a pump 28. A check valve 30 in the line is downstream from the pump but upstream from the flotation cell, and permits flow only in the direction of the flotation cell. Another control valve 32 is in line 16 between check valve 30 and the flotation cell.

A normally open float switch 33 in holding tank 18 controls pump 28. When there is sufficient water in the holding tank, the float switch closes and turns pump 28 on to deliver water to the flotation cell. When there is a predetermined low amount of water in tank 18, the same float switch turns off pump 28. Valve 32 controls the rate of pumping from tank 18 to maintain a continuous flow of raw water into and through flotation cell 22 at the current level of raw water input for purification. Check valve 30 prevents water from flowing towards tank 18. Valve 26 permits control of water into the pump.

Flotation cell 22 is known as such. A satisfactory cell is described in U.S. Pat. No. 3,175,687. Raw water from line 24 is aerated by an aeration pump of the cell. Air dissolved in water is introduced into the cell and comes out of solution because of a drop in pressure. A line 39 from a source of flocculents 40 supplies the flocculents used for solid removal from the water in cell.

Treated water from cell 22 passes through a line 42 and into a partially treated water surge vessel or tank 46.

A short chain cationic polymer flocculating agent or agents are metered into cell 22 from source 40 and through line 39, as previously stated. The flocculating agents cause the soil and solid particles to adhere to each other. The resultant agglomerates attach to air bubbles produced upon release of air from the water with decreased pressure. These bubbles and attached agglomerates rise to the surface of the cell as a foam or froth. The foam or froth is removed from the cell through a line 43. A shaker screen 45 concentrates solids from the effluent. The concentrated solids are conveyed away to a bin, pile or other acceptable storage facility prior to disposal by a screw conveyor 47.

Prior to entry into partially treated water storage vessel 46, the water is subjected to a sterilization agent, preferably a chemical agent such as fluorine, chlorine, or ozone. In some cases ultraviolet radiation may be used. A suitable introduction of a sterilization agent may be from a source 49 through a line 50 into line 42. In addition to the introduction of flocculent from source 40 through line 39 in flotation cell 22, chemicals may be added into the waste water holding tank as from a source and line 41. The addition of chemicals at this latter location takes advantage of air mixing because of air introduced through line 19. Chemical additives at 41 may be (a) flocculation aids, such as activated silica, clays, or polyelectrolytes; (b) buffers, such as sulfuric acid; and (c) conditioning chemicals, such as hydrated lime ($CaOH_2$) and soda ash ($Na_2CO_3$).

Treated water with a sterilization agent passes from line 42 into partially treated water storage vessel or tank 46. A normally open high level float switch 55 in tank 46 activates a pump 56 in a line 58 leading from tank 46 to a mixed media filter 60 to pump water into the filter when the water in the tank reaches a predetermined high level and closes the switch. A normally closed float level switch 57 at a predetermined low water level within tank 46 stops pump 56 to stop water flow through line 58 to the filter when this lower switch opens because of insufficient water.

Vessel 46 is baffled to increase the path of partially treated water through it and to thoroughly mix the water. The mixing assures that all of the water is subjected to sterilization. The long path assures ample time for sterilization.

Another normally closed float level switch 59 in tank 46 deenergizes pump 28 when the level of partially treated water in tank 46 reaches a predetermined level. This is a precaution to prevent the level of partially treated water from becoming excessive in the tank by preventing the generation of such water in flotation cell 22.

Line 58 has a valve 61 and a valve 62 upstream and downstream of pump 56, respectively. The line also has a flow meter 64 and a flow indicator 66 to indicate that flow is occurring in the line. A flow control valve 68 in line 58 determines flow of water through the line into the filter. A check valve 69 prevents backflow in the direction of pump 56. Another valve 70 in the line downstream from the flow control valve together with valve 62 permits the isolation of flow meter 64, flow indicator 66 and flow control valve 68.

Partially treated water from line 58 enters the top of filter 60 through a series of dispersion nozzles and flows down through a mixed media bed in the filter. The filter media is of different materials with different sizes and specific gravities. A suitable gradated bed is of small size particled garnet sand at the bottom, medium size silica sand particles in the middle, and large size anthracite particles at the top. The garnet sand has a specific gravity of 4.2, the silica sand has a specific gravity of 2.6 to 2.7, and the anthracite has a specific gravity of 1.5. Filtered water from filter 60 passes through a line 72 into a treated water storage vessel or tank 74. A valve 75 in line 72 controls the flow of water through the line.

Filter 60 is periodically cleaned in response to a predetermined maximum pressure differential between its input and output. As waste solids accumulate in the filter, the pressure drop across it increases to the predetermined maximum. In response to such a pressure differential the filter is backwashed with water from treated water storage vessel 74 by a pump 76 in a line 77. The duration of backwash is controlled by an adjustable timer. Each backwash may be recorded on an automatic timer. Alternatively, or in addition to the differential pressure initiated backwash, backwashes can be prescheduled by means of an adjustable timer or initiated by a push button. Backwash water is returned to raw water storage vessel 18 through a line 78. A flow control valve 79 in line 77 controls the flow rate of backwash water into the filter. A pair of valves 80 and 81 straddle flow control valve 79 and are opened in response to the pressure differential which initiates backwash. Valve 75 is closed during backwash. A valve 73 in line 78 is open only during backwash. Valve 70 is closed during this time and, of course, pump 56 is stopped.

Surfactants and solvents from a source 87 pass through a line 88 into line 77 for cleansing the filter media in filter 60 of grease and oil during backwash.

Thus, interlocks are provided to assure that the filter is not backwashing and filtering at the same time. There ma be air vents provided in the filter to remove air introduced with water. Air is preferably added to the backwash water, as through an eductor 89 discharging into line 77. This air agitates the sand filtering media for effective washing.

During backwash, water and air mix the media and remove solids. The solvents and surfactants remove oil and grease. Gravity stacks the media with the heaviest material on the bottom of the filter.

Fully treated and filtered water is stored in tank 74. Pump 76 runs constantly to supply a pressure head to a return line 82 to processing unit 10. The output of pump 76 goes through a line 83 to a heat exchanger 84, which is automatically controlled to heat water to a preset temperature. A control valve 91 in line 83 determines the flow through the line. A stream of water in continually diverted back to tank 74 through a line 85 from the heat exchanger. This flow is controlled manually by a control valve 86 in line 85 so that the tank contents are continually passing through the heat exchanger and being brought up to the required temperature for washing. In this manner the entire contents of tank 74 are maintained within a preset temperature range and ready for demand in processing unit 10. Accordingly, a much smaller heat exchanger may be used than would be required for instantaneous heat-up.

A check valve 96 in line 82 prevents flow from the processing unit. A valve 97 in line controls the flow to the processing units.

A check valve 98 in line 83 allows flow in the line only to heat exchanger 84. A valve 99 in the line controls the rate of flow from pump 76 to heat exchanger 84. Heat exchanger 84 gets its heat energy for heating from steam provided through a line 100. A thermostatically controlled valve 102 sensitive to the temperature of water in line 85 determines the amount of steam needed. A valve 104 also controls the flow of steam. Makeup water for process unit 10 comes from a line 106 from any convenient source.

The electrical controls for the operation of the system have been incidentally called out earlier in this description. The attendant circuits are shown schematically and abbreviated in the Figures and the controlled pumps are shown separately from thier depictions in the fluid circuit to avoid confusion. The electrical circuit includes a source of power 130. An on-off switch 132 in a line 134 controls whether current flows to the various pumps. Switch 33 is in series with source 130 and pump 28 in a line 136. Switch 23 is in series with pump 14 and the source of power through a line 138. Switches 57 and 55 are serially connected in a line 140 between the power source and pump 56. Switch 59 serially connects pump 28 to power source 130 through a line 142.

The present invention optimizes the utility of the flotation cell and the mix media filter by providing feed to these units while they run continuously and at each unit's required flow rate. Yet the vagaries of raw wash water generation and fresh water demand are met. Basically this is done by providing the various holding vessels. Tank 18 stores raw waste water from the washing facility and backwash for processing in flotation cell 22. If there is insufficient raw water to satisfy the capacity and throughput rate requirements of the cell, float switch 33 prevents delivery of water to the cell. When the capacity of tank 18 is in danger of being exceeded, switch 23 stops raw wash water feed. Intermediate tank 46 has high and low water controls in switches 55 and 57. When there is insufficient water in the tank because of insufficient input from the flotation cell, the filter will not be supplied because switch 57 opens. Switch 55 does not close the circuit to filter makeup water pump 56 until there is sufficient water for the filter. When there is danger of exceeding the capacity of tank 46, switch 59 stops pump 28 and prevents raw wash water feed to its storage tank. Thus, there is a system whose components can each operate optimally at different rates and which provides ready-to-use treated wash water for the demand of a laundry facility, the latter demand satisfaction being described earlier.

Sterilization is easily accomplished downstream of the flotation cell. The partially treated water storage vessel provides ample time for chemical sterilizing agents to perform their function. The baffling of the vessel assures complete mixing and adequate residence for sterilization.

Typically, raw water from the processing unit 10, say washing facilities, is collected at a temperature ranging from city water temperature of about 60° F. to hot water at about 180° F. Typically, the average temperature, is about 120° F. The pH of the raw water ranges from 6.5 to 12 and remains unchanged throughout the process just described. The active alkalinity level also varies widely from zero to 1500 ppm and remains unchanged throughout the process. It is preferred that the active alkalinity level be about 250 ppm and that the pH be about 10.5. The higher the alkalinity level the more soil removed from wash.

It has been found that suspended solids in the waste water vary from about 20 to about 3500 ppm. In the latter concentrations it is difficult to treat the water. Accordingly, waste streams are preferably combined in such a manner as to produce a composite having about 500 ppm or less of suspended solids. The purification process and system of the present invention purifies the waste water to a solid content of about 20 ppm. The flotation cell removes about 80% of the suspended solids and the filter removes about 80% of the solids remaining after flotation.

Filtration is not sensitive to temperature. Usually the temperature during filtration is about the same as the collected raw wash water, typically about 120° F. The finally treated water is typically raised to about 190° F. for its introduction into the wash cycle.

The flocculating agent is a short chain cationic polymer added to the flotation cell at a rate of from between about 0.25 and about 1.0 a gallon per hour as diluted to 1% strength.

Figure 2:
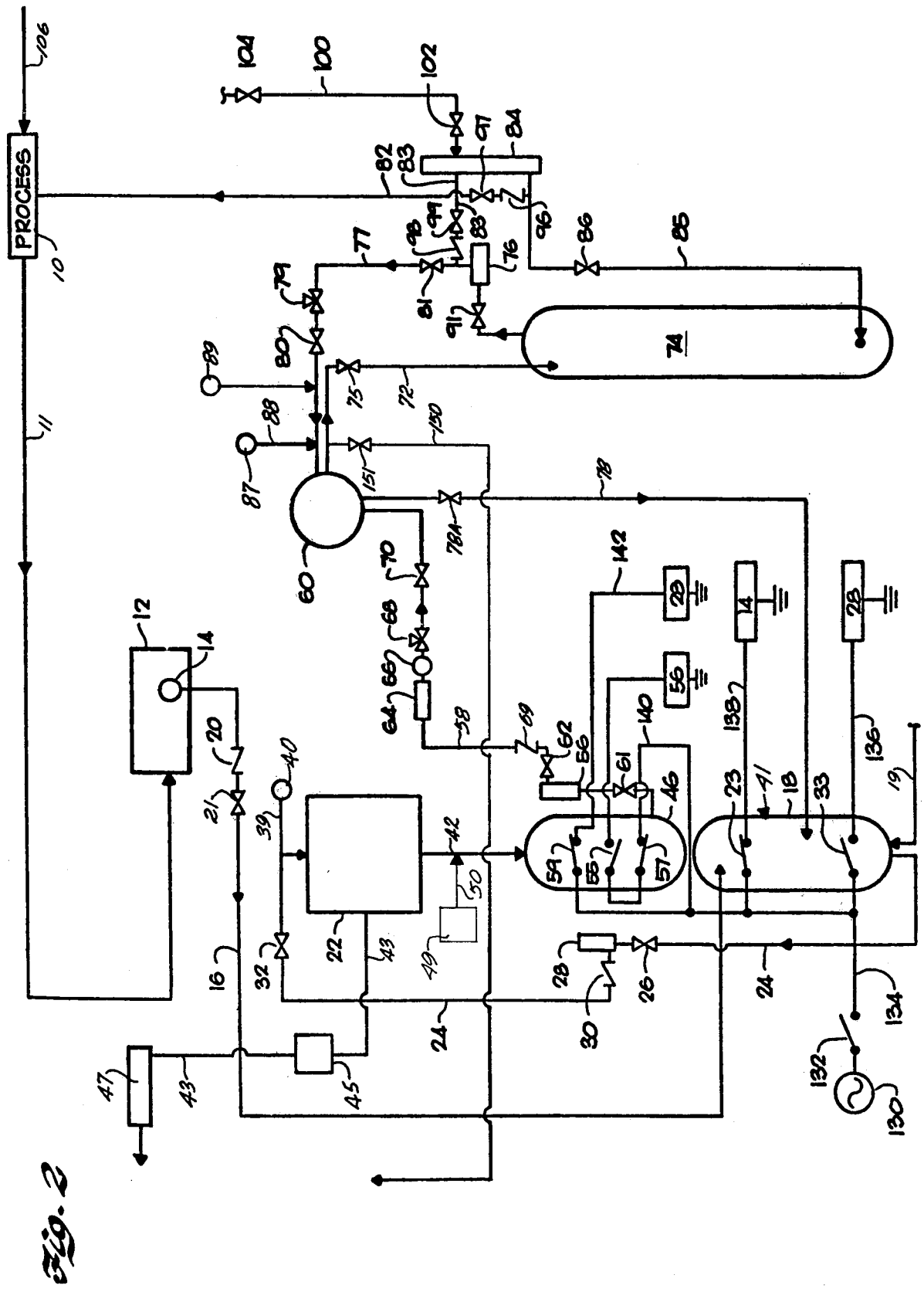
FIG. 2 is a flow schematic similar to FIG. 1 embodiment with a modification.

FIG. 2 is a modification of the embodiment of FIG. 1. The components of the FIG. 2 embodiment which are the same as the FIG. 1 embodiment are identified with common reference numerals. The difference is that no raw water is discharged prior to treatment as it is the FIG. 1 embodiment through line 13 from raw water collection tank 12. Instead, fully treated water is removed after filter 60. A line 150 from filter discharge line 72 goes to a sanitary sewer. A flow control valve 151 in line 150 determines the amount of discharge. This embodiment provides maximum discharge water purity.

Figure 3:
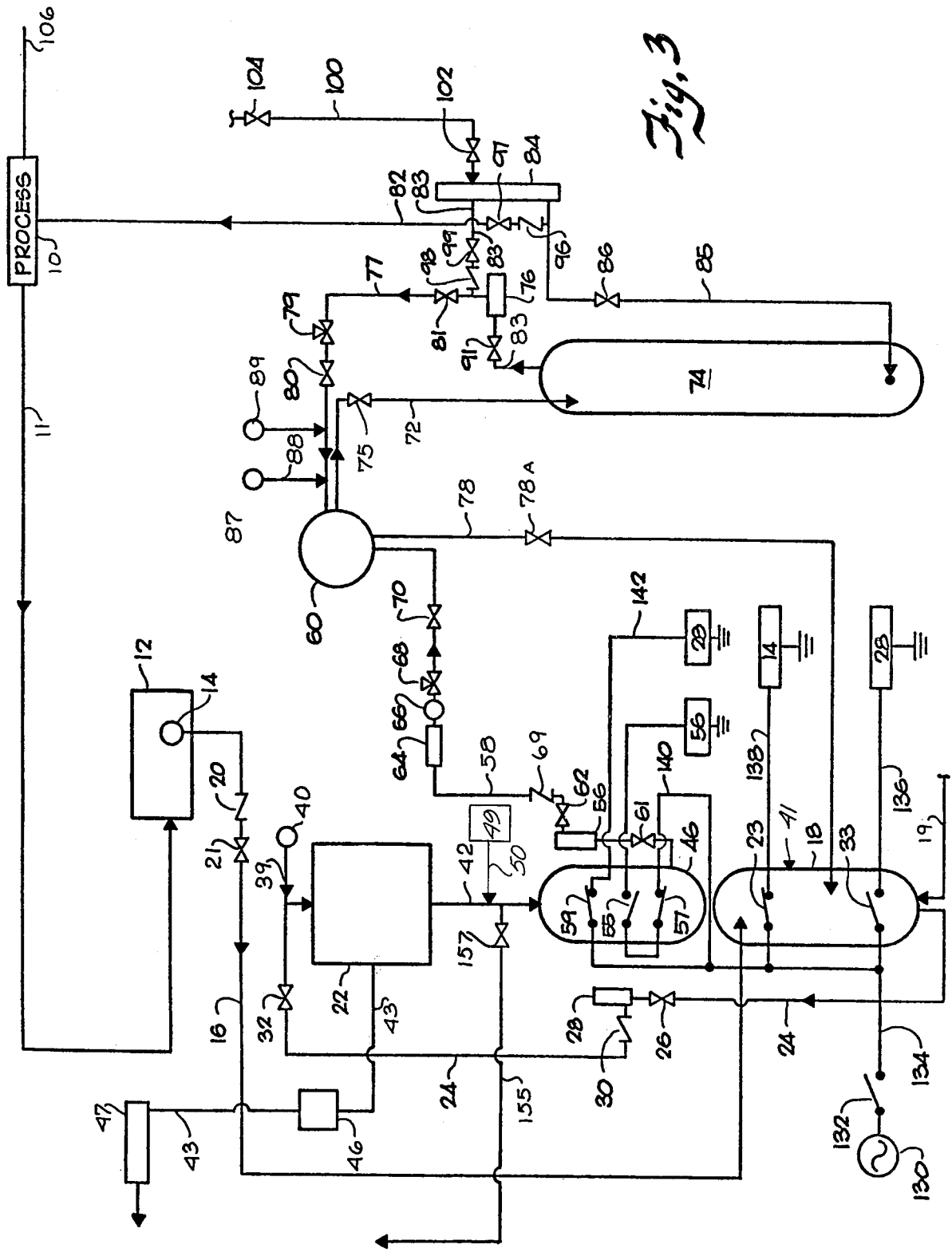
FIG. 3 is a flow schematic similar to FIG. 1 embodiment with a second modification.

Like the embodiment of FIG. 2, the embodiment of FIG. 3 has many of the same components as the embodiment of FIG. 1. Accordingly, common reference numerals are used. The difference is that water is discharged from the unit with solid removal only at flotation cell 22 and discharged into a sanitary sewer. Thus, insofar as discharged water is concerned, the FIG. 3 embodiment is intermediate the FIGS. 2 and 3 embodiments. Discharge is immediately downstream of flotation cell 22 by a line 155 branching off line 42. Flow into line 155 is controlled by a valve 157.

Figure 4:
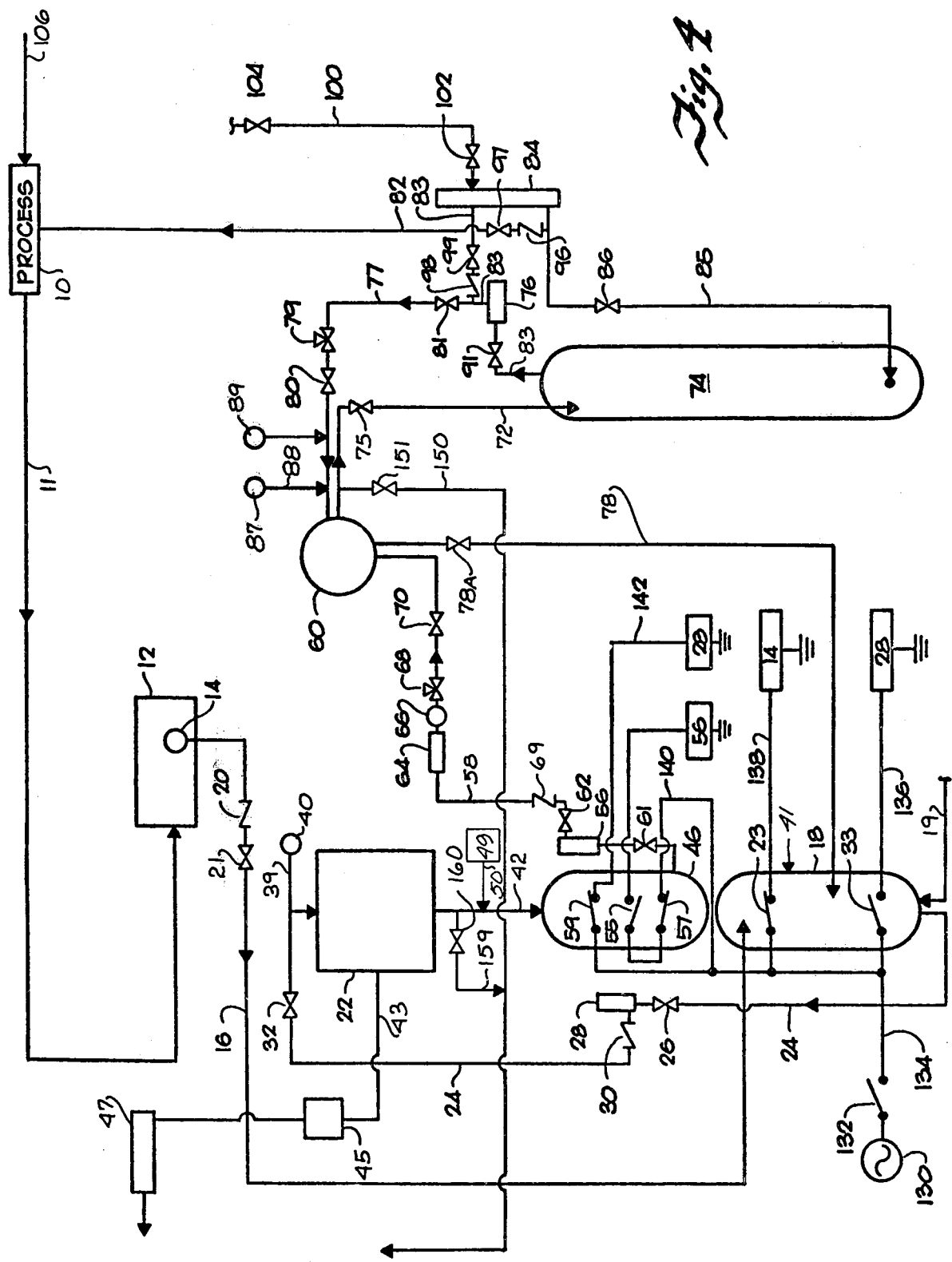
FIG. 4 is a flow schematic similar to the FIG. 1 embodiment with a third modification.

FIG. 4 blends the water discharge of FIGS. 2 and 3. Again components are in common with FIG. 1 and are identified with the same reference numerals. Discharge of water to a sanitary sewer occurs after filter 60 in the manner of FIG. 2 through line 150 and a control valve 151 in the line. In addition, water for discharge is taken immediately downstream of flotation cell 22 from line 42 by way of a line 159. A valve 160 in line 159 controls flow through it. Line 159 joins line 150 to the sanitary sewer. This embodiment offers the advantage of process stabilization. Considering that the filter and flotation cell have different demands, water can yet be fed to the system uniformly and have the required degree of purity in the discharge water without large purification components.

The present invention has been described with reference to a certain preferred embodiment. The spirit and scope of the appended claims should not, however, necessarily be limited to the foregoing description.

What is claimed is:

1. A process for the purification of waste water by the removal of suspended solid waste therefrom comprising the steps of:
    (a) accumulating said waste water in a waste water holding vessel to obtain a first predetermined initiating threshold quantity thereof;
    (b) introducing waste water from the waste water holding vessel into a flotation cell at a first continuous and predetermined rate after the first predetermined initiating threshold quantity is present in the waste water holding vessel, the first continuous and predetermined rate corresponding to the rate and quantity requirements of the flotation cell, such waste water introduction into the flotation cell reducing the quantity of waste water in the waste water holding vessel to a first predetermined small quantity of waste water;
    (c) agglomerating said suspended solid waste from the water in the flotation cell to produce partially treated water;
    (d) removing the agglomerated suspended solid waste from the flotation cell;
    (e) terminating waste water introduction into the flotation cell when the first predetermined small quantity of waste water is present in the waste water holding vessel, the first predetermined initiating threshold quantity being sufficient for the flow rate and quantity requirements of the flotation cell, the first predetermined small quantity corresponding to an insufficient quantity of waste water for the flow rate and quantity requirements of the cell;
    (f) accumulating partially treated water from the flotation cell in a partially treated water holding vessel to obtain a second predetermined initiating threshold quantity of partially treated water;
    (g) sterilizing the partially treated water;
    (h) introducing partially treated water from the partially treated water holding vessel into a filter at a second continuous and predetermined rate after the second predetermined initiating threshold quantity is present in the partially treated water holding vessel, such partially treated water introduction into the filter reducing the quantity of partially treated water in the partially treated water holding vessel to a predetermined second small quantity of partially treated water, the second continuous and predetermined rate corresponding to the rate and quantity requirements of the filter and being different from the first continuous and predetermined rate;
    (i) filtering water treated in the flotation cell in the filter to remove additional suspended solid waste;
    (j) terminating partially treated water introduction into the filter when the predetermined second small quantity of partially treated water is present in the partially treated water holding vessel, the second predetermined initiating threshold quantity being sufficient for the flow rate and quantity requirements of the filter, the second predetermined small quantity corresponding to an insufficient quantity of partially treated water for the flow rate and quantity requirements of the filter; and
    (k) recycling the filtered water to the source of the waste water.

2. The process claimed in claim 1 wherein the sterilization step includes treating the partially treated water with a chemical sterilization agent in the partially treated water storage vessel.

3. The process claimed in claim 2 including mixing the water in the partially treated water storage vessel and directing the water therein along a tortuous path to increase residence time of the water in the treated water storage vessel.

4. The process claimed in claim 3 including the step of terminating waste water accumulation in the waste water holding vessel when a predetermined maximum quantity of partially treated water is in the partially treated water holding vessel.

5. The process claimed in claim 4 including the steps of:
   (a) storing the filtered water in a storage vessel before the recycling step; and
   (b) heating the stored water to within a predetermined temperature range for immediate use in the wash cycle.

6. The process claimed in claim 5 including:
   (a) dissolving air in the waste water prior to the agglomeration step;
   (b) releasing dissolved air in the waste water during the agglomeration step to produce air bubbles;
   (c) flocculating the water in the flotation cell during the agglomeration step to produce the agglomerates of said suspended solid waste; and
   (d) adhering the agglomerates to the bubbles, the removal step removing the adhered agglomerates.

7. The process claimed in claim 5 wherein the flocculating agent is a short chain cationic polymer.

8. The process claimed in claim 3 including discharging a portion of the waste water to sewage prior to the introduction step.

9. The process claimed in claim 3 including discharging a portion of the filtered water to sewage prior to the recycling step.

10. The process claimed in claim 3 including discharging a portion of the partially treated water to sewage.

11. The process claimed in claim 3 including:
    (a) discharging a portion of the filtered water to sewage prior to the recycling step; and
    (b) discharging a portion of the partially treated water to sewage.

12. A process for recycling waste water containing suspended solid waste comprising the steps of:
    (a) collecting said waste water from a source thereof in a waste water holding vessel;
    (b) introducing the collected waste water into a flotation cell when there is a predetermined large quantity of waste water in the waste water holding vessel, such waste water introduction into the flotation cell reducing the quantity of waste water in the waste water holding vessel to a predetermined small quantity of such waste water, the flotation cell having predetermined flow rate and quantity requirements;
    (c) terminating the introduction of collected waste water into the flotation cell when there is the predetermined small quantity of waste water in the waste water holding vessel;
    (d) collecting said suspended solid waste from the waste water in the flotation cell by flocculation and aeration to form agglomerates of said suspended solid waste ahering to air bubbles produced by aeration and partially treated water;
    (e) removing the agglomerates of said suspended solid waste from the flotation cell;
    (f) collecting partially treated water from the flotation cell in a partially treated water holding vessel;
    (g) sterilizing the partially treated water in the partially treated water holding vessel with a chemical agent and by mixing the partially treated water and chemical agent in the partially treated water holding vessel, and by directing the water in the partially treated water holding vessel along a tortuous path;
    (h) introducing the partially treated water from the partially treated water holding vessel into a filter when there is a predetermined large quantity of such water in the partially treated water holding vessel, such partially treated water introduction into the filter reducing the quantity of partially treated water in the partially treated water holding vessel to a predetermined small quantity of such partially treated water, the filter having predetermined flow rate and quantity requirements different from the predetermined flow rate and quantity requirements of the flotation cell;
    (i) terminating the introduction of partially treated water into the filter when there is the predetermined small quantity of such water in the partially treated water holding vessel;
    (j) the predetermined large quantities of water in the waste water holding vessel and partially treated water holding vessel corresponding to quantities of water sufficient to supply the flotation cell and filter, respectively, at their predetermined flow rates and quantities, the predetermined small quantities in such vessels corresponding to insufficient water for such flow rates and quantities;
    (k) filtering partially treated water in the filter to form filtered water;
    (l) collecting filtered water in a treated water storage vessel;
    (m) heating the filtered water in the treated water storage vessel to a predetermined temperature; and
    (n) recycling the heated water from the treated water storage vessel as feed to the source.

13. The process claimed in claim 12 including the step of terminating collection of waste water in the waste water holding vessel when a predetermined maximum quantity of partially treated water collects in the latter's holding vessel.

14. The process claimed in claim 13 including the step of periodically backwashing the filter with water from the collected water storage vessel.

15. The process claimed in claim 12 wherein flocculation is accomplished with a short chain cationic polymer.

16. The process claimed in claim 12 wherein:
    (a) aeration is by dissolving air in the waste water and releasing the dissolved air as bubbles by reducing water pressure in the flotation cell;
    (b) the bubbles gather the agglomerated suspended solid waste for the solid collection; and
    (c) the filtering is by a mixed media.

17. The process claimed in claim 16 wherein flocculation is accomplished with a short chain cationic polymer.

18. The process claimed in claim 17 including discharging a portion of the waste water to sewage prior to the introduction step.

19. The process claimed in claim 17 including discharging a portion of the filtered water to sewage prior to the recycling step.

20. The process claimed in claim 17 including discharging a portion of the partially treated water to sewage.

21. The process claimed in claim 17 including:
(a) discharging a portion of the filtered water to sewage prior to the recycling step; and
(b) discharging a portion of the partially treated water to sewage.

* * * * *

UNITED STATES PATENT AND TRADEMARK OFFICE
CERTIFICATE OF CORRECTION

PATENT NO. : 4,211,651

DATED : July 8, 1980

INVENTOR(S) : Robert C. Thomas

It is certified that error appears in the above—identified patent and that said Letters Patent is hereby corrected as shown below:

In the specification: Column 3, line 9, before "FIG. 1" insert --the--; Column 3, line 11, before "FIG. 1" insert --the--. Column 5, line 42, "ma" should be --may--. Column 6, line 2, before "line" insert --the--; Column 6, line 2, after "controls" delete "the"; Column 6, line 18, "thier" should be --their--; Column 6, line 32, after "fresh" insert --wash--. Column 7, line 29, before "the" insert --in--.

Signed and Sealed this

Twenty-fourth Day of February 1981

[SEAL]

Attest:

RENE D. TEGTMEYER

Attesting Officer

Acting Commissioner of Patents and Trademarks